US011279839B2

(12) United States Patent
Edaka et al.

(10) Patent No.: US 11,279,839 B2
(45) Date of Patent: Mar. 22, 2022

(54) USE OF BLACK DYES IN COLOR INKS TO ENHANCE PRINT QUALITY

(71) Applicant: FUNAI ELECTRIC CO., LTD., Osaka (JP)

(72) Inventors: Keiichi Edaka, Lexington, KY (US); Ajay K. Suthar, Lexington, KY (US)

(73) Assignee: Funai Electric Co., Ltd.

( * ) Notice: Subject to any disclaimer, the term of this patent is extended or adjusted under 35 U.S.C. 154(b) by 593 days.

(21) Appl. No.: 15/883,132

(22) Filed: Jan. 30, 2018

(65) Prior Publication Data

US 2019/0233669 A1 Aug. 1, 2019

(51) Int. Cl.
*C09D 11/00* (2014.01)
*C09D 11/328* (2014.01)
*C09B 67/00* (2006.01)
*C09D 11/40* (2014.01)
*C09B 67/22* (2006.01)
*C09D 1/00* (2006.01)
*C09D 4/00* (2006.01)
*C09D 5/00* (2006.01)
*C09K 3/00* (2006.01)

(52) U.S. Cl.
CPC ............ *C09D 11/328* (2013.01); *C09B 67/00* (2013.01); *C09B 67/0033* (2013.01); *C09D 11/40* (2013.01)

(58) Field of Classification Search
USPC ......... 106/31.48, 31.47, 31.46, 31.43, 31.27, 106/31.13, 31.01
See application file for complete search history.

(56) References Cited

U.S. PATENT DOCUMENTS

| | | | |
|---|---|---|---|
| 5,476,746 A | 12/1995 | Janssens et al. | |
| 6,120,589 A | 9/2000 | Bannai et al. | |
| 6,152,969 A | 11/2000 | Matsumoto et al. | |
| 6,511,169 B1 | 1/2003 | Gallo et al. | |
| 6,663,236 B2 | 12/2003 | Sharma | |
| 6,779,881 B2 | 8/2004 | Ito et al. | |
| 6,786,571 B2 | 9/2004 | Fukumoto et al. | |
| 7,033,423 B2 | 4/2006 | Rolly | |
| 7,060,124 B2 | 6/2006 | Wuzik et al. | |
| 8,475,578 B2 | 7/2013 | Dodge et al. | |
| 2003/0051633 A1* | 3/2003 | Blease ............... | C09D 11/40 106/31.47 |
| 2004/0095432 A1 | 5/2004 | Kakutani | |
| 2008/0072786 A1 | 3/2008 | Okuda et al. | |

FOREIGN PATENT DOCUMENTS

EP 1281738 A1 2/2003

* cited by examiner

*Primary Examiner* — James E Mcdonough

(74) *Attorney, Agent, or Firm* — Luedeka Neely Group, PC

(57) ABSTRACT

A magenta dye-based ink composition and a method for improving the print qualities of a magenta dye-based ink composition. The magenta dye-based ink composition includes one or more red dye(s) and a minor but effective amount of black dye. A weight ratio of red dye(s) to black dye in the ink composition ranges from about 20:1 to about 100:1.

19 Claims, 3 Drawing Sheets

USE OF BLACK DYES IN COLOR INKS TO ENHANCE PRINT QUALITY

TECHNICAL FIELD

The is directed to improved ink compositions that maximize color saturation on a surface of a substrate and provides increased contrast, desired color shade, and lightfastness, in particular for magenta inks.

BACKGROUND AND SUMMARY

Ink jet recording is an advantageous print method used in many commercial products. Beneficial characteristics include small size, high speed, low cost, and adaptability to various substrates. Such ink jet recording methods typically use ink sets derived from dye-based or pigment-based inks. Dye-based inks using water soluble colorants are suitable for various printing applications requiring the inks to penetrate through the surface of the substrate. However, one or more of the colors suffer from an ability to provide the right hue angle or shade, high contrast, and lightfastness. Attempts to increase contrast and proper hue angle of dye-based inks using a combination of similar colorants in the ink formulations have failed to achieve the desired results.

The choice of a colorant in inkjet systems is critical to image quality. For colors such as cyan, magenta, yellow, green, orange, etc., the peak wavelength (k-max), the width of the absorption curve and the absence of secondary absorptions are important. The colorant should also have a high degree of light fastness after printing onto the ink-receiving substrate. For aqueous dye-based inks, the dye needs to be sufficiently soluble in water to prepare a solution that is capable of producing adequate density on the receiving substrate, yet is stable for extended periods of storage without precipitation. High quality photorealistic ink jet printing with dye-based inks requires dyes which will provide both bright hue and good light stability. It is difficult to find dyes, particularly magenta dyes, which meet all of these requirements.

It is well known in the art of color measurement that hue and brightness are among the basic perceptual attributes of color. Hue is defined as the attribute of a visual sensation according to which an area appears to be similar to one, or to proportions of two, of the perceived colors red, yellow, green and blue.

In terms of the CIELAB color space, hue is mathematically defined by hue angle, $h°$, according to $h°=\tan^{-1}(b^*/a^*)$, where $a^*$ is a measure of how green or red the color is and $b^*$ is a measure of how blue or yellow a color is.

Brightness is defined as the attribute of a visual sensation according to which an area appears to exhibit more or less light. In terms of the CIELAB color space, brightness is mathematically defined by chroma, $C^*$, according to $C^*=(a^{*2}+b^{*2})^{1/2}$.

For the production of high quality photorealistic images via ink jet printing, ink sets must be able to provide printed images having good color characteristics. In particular, it is desirable to have hue angles of about 270 for the blue record and from about 340 to about 342 for the magenta record. It is also desirable to maximize chroma (also referred to as vividness), particularly for the red record. A $C^*$ of greater than 75 is particularly desirable for a magenta ink.

Color difference can be defined as the numerical comparison of a sample's color to a standard. Differences in absolute color coordinates are referred to as Delta ($\Delta$). Formulas are used to calculate the difference between two colors to identify inconsistencies and help users control the color of their products more effectively.

Defined by the Commission Internationale de l'Eclairage (CIE), the $L^*a^*b^*$ color space was modeled after a color-opponent theory stating that two colors cannot be red and green at the same time or yellow and blue at the same time. As shown below, $L^*$ indicates lightness, $a^*$ is the red/green coordinate, and $b^*$ is the yellow/blue coordinate. Deltas for $L^*$ ($\Delta L^*$), $a^*$ ($\Delta a^*$) and $b^*$ ($\Delta b^*$) may be positive (+) or negative (−). The total difference, Delta E ($\Delta E^*$), however, is always positive. For magenta inks, an $L^*$ of less than 50 is particularly desirable.

As used herein $\Delta L^*$ means the difference in lightness and darkness of a sample compared to a standard ($L^*$ of the sample minus $L^*$ of a standard) wherein a positive $\Delta L^*$ is lighter and a negative $\Delta L^*$ is darker.

As used herein $\Delta a^*$ means a difference between red and green of a sample compared to a standard ($a^*$ sample minus $a^*$ standard) wherein a positive $\Delta a^*$ is redder and a negative $\Delta a^*$ is greener.

As used herein $\Delta b^*$ means a difference between yellow and blue of a sample compared to a standard ($b^*$ sample minus $b^*$ standard) wherein a positive $\Delta b^*$ is yellower and a negative $\Delta b^*$ is bluer.

As used here $\Delta E^*$ is the total color difference of a sample as the sample fades over time. Accordingly, $\Delta E^*$, as used herein, represents the lightfastness of the ink. For a magenta ink a $\Delta E^*$ of less than 5 is particularly desirable.

To determine the total color difference between all three coordinates, the following formula is used:

$$\Delta E^* = [\Delta L^{*2} + \Delta a^{*2} + \Delta b^{*2}]^{1/2}$$

Colorfast magenta dye-based inks, when printed on a substrate have two particularly troublesome qualities: namely, (1) the hue angle (h) of the printed magenta ink is toward the red shade and (2) the printed ink has a high $L^*$ which provides undesirably low contrast images. Accordingly, there remains a need for an ink-set, and in particular, a magenta dye-based ink that provides the desired hue angle and high contrast image without sacrificing the lightfastness of the ink.

In view of the foregoing, embodiments of the disclosure provide magenta dye-based ink composition and a method for improving the print qualities of a magenta dye-based ink composition. The magenta dye-based ink composition includes one or more red dye(s) and a minor but effective amount of black dye. A weight ratio of red dye(s) to black dye in the ink composition ranges from about 20:1 to about 100:1.

Another embodiment of the disclosure provides a method for improving the print qualities of a magenta dye-based ink composition. The method includes providing one or more red dyes, and mixing a minor amount of black dye with the one or more red dyes in a weight ratio of red dye to black dye of from about 20:1 to about 50:1 to provide the magenta dye-based ink composition.

In some embodiments, the amount of black dye ranges from about 0.05 to about 0.25 percent by weight based on a total weight of the ink composition.

In other embodiments, the black dye is a lightfast black dye having a bluish tint. In some embodiments, the black dye is an azo direct dye black.

In other embodiments, the red dye is selected from the group consisting of acid red dyes, anthrapyridone disulfonic acid dyes, pyridine azo dyes, and mixtures thereof.

In some embodiments, the magenta ink composition further includes a humectant, a solvent, a penetrant, a surfactant, and water.

Other embodiments include a ink set that contains a cyan ink composition, a yellow ink composition, and a magenta ink composition, wherein the magenta ink composition includes one or more red dyes and a minor effective amount of black dye sufficient to improve the print quality of the magenta ink composition.

An advantage of the disclosed embodiments is that the ink-set exhibits substantially improved image contrast and desired color shade compared to a magenta ink composition that is devoid of black dye.

BRIEF DESCRIPTION OF THE DRAWINGS

Further features and advantages of the disclosed embodiments may be evident from the detailed description in combination with the drawings wherein.

DETAILED DESCRIPTION OF EXEMPLARY EMBODIMENTS

Figure 1:
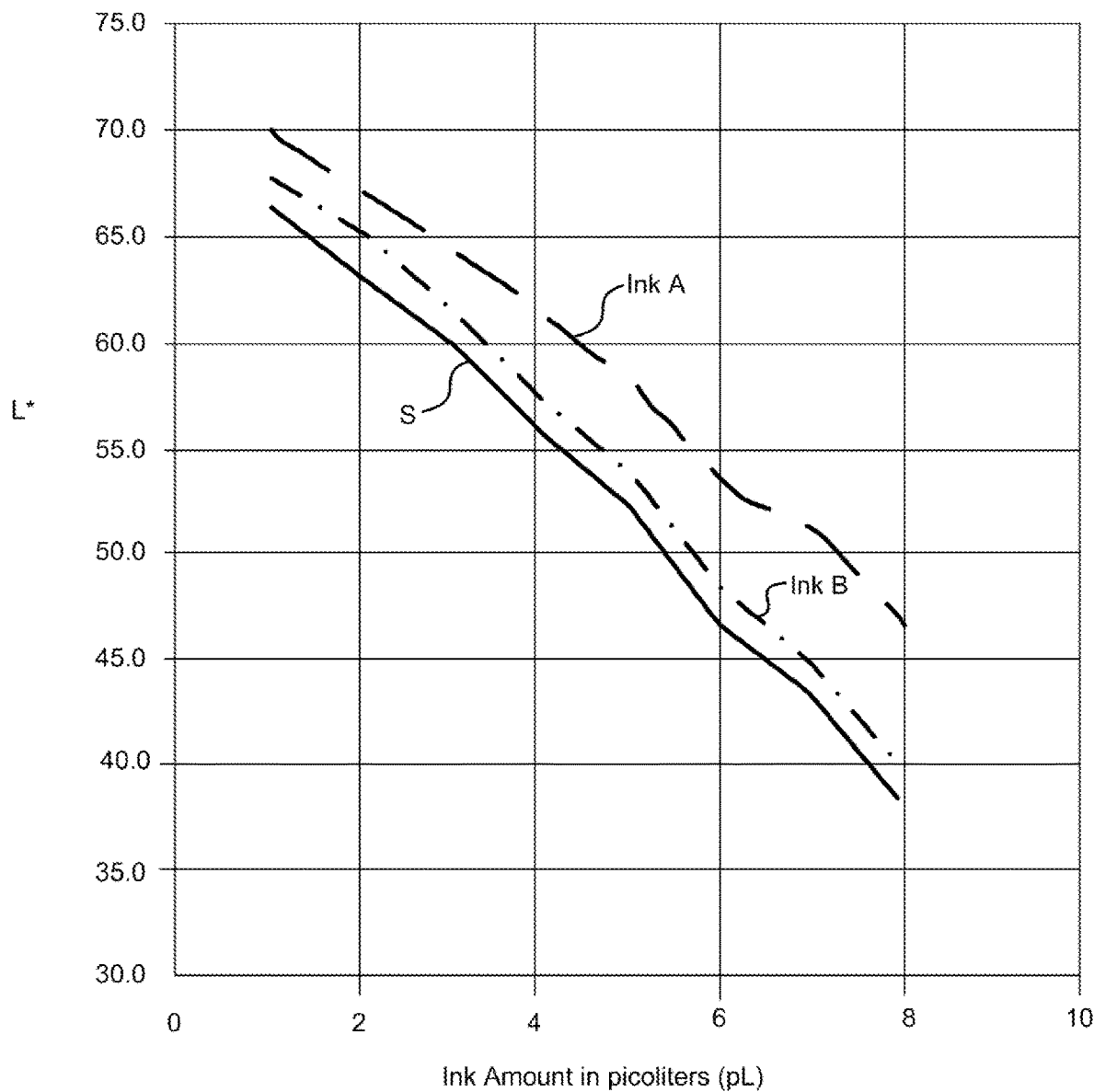
FIG. 1 is a graphical representation of image intensity of a magenta printed image on a substrate.

The dyes that may be used in accordance with embodiments of the disclosure are dyes commonly used in ink jet inks such as, for example, Acid, Direct, Food, and Reactive dyes, are all suitable for use as colorants in the present invention. Essentially any dye that permits the formation of colored visible images on a recording medium may be used.

An illustrative list of such dyes includes, but is not limited to, nitro dyes, nitroso dyes, azo dyes such as mono-azo, di-azo and poly-azo dyes, mordant dyes, preformed metal complexes such as formazan copper complexes, pyrazolones and stilbenes, thiazoles, diphenylmethanes, triphenylmethanes, xanthenes, cridines, azines, oxazines, thiazines, quinines and indigoids. It is particularly preferred that the dye be water soluble.

Illustrative black dyes include, but are not limited to, direct dyes such as C.I. Direct Black 2, 4, 9, 11, 14, 17, 19, 22, 27, 32, 36, 41, 48, 51, 56, 62, 71, 74, 75, 77, 78, 80, 105, 106, 107, 108, 112, 113, 117, 132, 146, 154, 168, 171, and 194. Other black dyes that may be used include Direct Black 154 and Direct Black 168. Acid dyes such as C.I. Acid Black 1, 2, 7, 16, 17, 24, 26, 28, 31, 41, 48, 52, 58, 60, 63, 94, 107, 109, 112, 118, 119, 121, 122, 131, 155, and 156 may also be used. Additionally, the black dye may be selected from basic dyes such as C.I. Basic Black 2 and 8, reactive dyes such as C.I. Reactive Black 1, 3, 5, 6, 8, 12, and 14, and food dyes such as C.I. Food Black 1 and 2. Accordingly, other black dyes include ILFORD K-1334, ILFORD K-1332 available from Ilford Imaging USA, Inc. of Paramus, N.J., Fast Black, Basacid Black X38, Bayscript Special Black SP, JPD LMBK-001 (an azo direct dye black from Nippon Kayaku Co., Ltd. of Tokyo, Japan), and azo black dyes such as PRO-JET CBA black from Fujifilm Imaging Colorants, Ltd.

Illustrative magenta dyes include, but are not limited to, JPD LM-1 Liquid (an anthrapyridone disulfonic acid magenta dye from Nippon Kayaku Co., Ltd of Tokyo, Japan), and the magenta dye described in U.S. Pat. No. 5,254,160. Other magenta dyes may be selected from Acid Red 35, Acid Red 52, Acid Red 81, Acid Red 249, Acid Red 289, Direct Red 289, Direct Red 227, Direct Violet 107 PROJET Magenta 2, PROJET Magenta 3BOA, DUASYN Magenta NM-SF, ILFORD® M377, 1-(2,4-xylylazo)-2-naphthol-3,6-disulphonic acid disodium salt (ACID RED 26); trisodium 3-hydroxy-4-(4-sulfonato-1-naphthylazo)-2, 7-naphthalenedisulfonate (ACID RED 27); 7-naphthalene-disulfonicacid,4-amino-5-hydroxy-6-phenylazo-disodium salt (ACID RED 33); sulforhodamine B monosodium salt (ACID RED 52); 2-(2,4,5,7-tetrabromo-6-hydroxy-3-oxo-3h-xanthen-9-yl)-benzoic acid disodium (ACID RED 87); 2',4',5',7'-tetrabromo-4,5,6,7-tetrachloro-fluoresceidisodium salt (ACID RED 92); 4,5,6,7-tetrachloro-2',4',5',7'-tetraiodo-fluoresceidisodium salt (ACID RED 94); and xanthylium,9-(2-carboxyphenyl)-3-[(2-methylphenyl)amino]-6-[(2-methyl-4-sulfophenyl)amino]-hydroxide, inner salt, monosodium salt (ACID VIOLET 9), IJINKM-001 SLK (a pyridine azo dye from FujiFilm Imaging Colorants, Inc. of Japan), and combinations thereof.

Illustrative yellow dyes include, but are not limited to, Nippon Yellow JPD LM-NL Liquid, Direct Yellow 132, Direct Yellow 86, Acid Yellow 42, Acid Yellow 17, Direct Yellow 44, Direct Yellow 50, Direct Yellow 86, Direct Yellow 173, PROJET fast Yellow 2, PROJET Yellow 746, ILFORD®Y1189, 2,4-dinitro-1-naphthol-7-sulfo disodium salt (ACID YELLOW 1); benzenesulfonic acid, 4-4,5-dihydro-3-methyl-5-oxo-4-(phenylazo)-1H-pyrazol-1-yl-, sodium salt (ACID YELLOW 11); 1H-Pyrazole-3-carboxylic acid, 4,5-dihydro-5-oxo-1-(4-sulfophenyl)-4-[(4-sulfophenyl)azo]-,trisodium salt (ACID YELLOW 23); Sodium 5-chloro-2-(5-hydroxy-3-methyl-4-(4-((4-methylphenyl)sulphonyloxy)phenylazo)-pyrazol-1-yl)benzenesulphonate (ACID YELLOW 40); and 9-(o-carboxyphenyl)-6-hydroxy-3h-xanthen-3-one,disodiumsalt (ACID YELLOW 73), and mixtures thereof.

Illustrative cyan dyes include, but are not limited to, a copper phthalocyanine dye having sulfonylamine groups such as Fuji PROJET Cyan GLF, Nippon Cyan JPD LM-1 Liquid, benzenemethanaminium, N-ethyl-N-[4-[[4-[ethyl[(3-sulfophenyl)methyl]amino]phenyl](4-hydroxy-2-sulfophenyl)methylene]-2,5-cyclo-hexadien-1-ylidene]-3-sulfo-, inner salt, disodium salt (FOOD BLUE 2); sodium 1-amino-9,10-dioxo-4-phenylaminoanthracene-2-sulphonate (ACID BLUE 5); benzenemethanaminium, N-ethyl-N-[4-[[4-[ethyl[(3-sulfophenyl)methyl]-amino]phenyl](2-sulfophenyl) methyl ene]-2,5-cy-clohexadien-1-ylidene]-3-sulfo-, inner salt, diammonium salt (ACID BLUE 9); and benzenemethanaminium,N-[4-[[4-[(4-ethoxy-phenyl)amino]phenyl][4-[ethyl [(3-sulfophenyl)-methyl]amino]-2-methylphenyl] methylene]-3-methyl-2,5-cyclohexadien-1-ylidene]-N-ethyl-3-sulfo-, inner salt, monosodium salt (BRILLIANT BLUE), and mixtures thereof.

Each of the ink compositions in the ink-set may include a humectant selected from the group consisting of dipropylene glycol, tripropylene glycol, triethylene glycol, tetraethylene glycol, 1,(2,-hydroxyethyl)-2-pyrrolidone, trimethyolpropane, 1,2-propanediol, 1,3-propanediol, 1,5-pentanediol, 2-pyrrolidone, polyethylene glycol, diethylene glycol, triethylene glycol, tetraethylene glycol, 2,2-thiodiethanol, and mixtures thereof and a penetrant selected from the group consisting of 1,2-hexandiol, hexyl carbitol, diethylene glycol butyl ether, diethylene glycol benzyl ether, n-propyl alcohol, secondary alcohol ethoxylates, ethoxylated acetylenic diols, polyalkyleneoxide modified heptamethyltrisiloxane, and mixtures thereof. A particularly preferred humectant is a mixture of polyethylene glycol having a number average molecular weight of about 400 (PEG 400) and 2-pyrrolidone. The amount of PEG 400 in the ink composition preferably ranges from about 3 to about 10 percent by weight, most preferably from about 7 to about 8 percent by weight based on the total weight of the ink composition. The amount of 2-pyrrolidone in the ink composition also preferably ranges from about 3 to about 10 percent by weight, most preferably from about 7 to about 8 percent by weight based on the total weight of the ink composition.

Ink compositions according to the disclosure also include an ink vehicle or carrier fluid which is a major portion of the ink composition. The amount of ink vehicle in the ink composition typically ranges from about 60 to about 80 percent by weight of the total weight of the ink composition. A particularly suitable ink vehicle is deionized water, however, the disclosed embodiments are not limited to use of water as an ink vehicle and thus may include ink compositions made with organic-based ink vehicles and mixtures of organic-based ink vehicles and water.

Selection of a suitable carrier mixture depends on the requirements of the specific application involved, such as desired surface tension and viscosity, the selected colorant combination, the desired drying time of the ink, and the type of paper onto which the ink will be printed. Representative examples of water soluble organic solvents that may be selected include: (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols, such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol, 1,2,6-hexanetriol and thiodiglycol; (6) lower alkyl mono- or di-ethers derived from alkylene glycols, such as ethylene glycol monomethyl (or monoethyl) ether, diethylene glycol monomethyl (or monoethyl) ether, propylene glycol monomethyl (or monoethyl) ether, triethylene glycol monomethyl (or monoethyl) ether and diethylene glycol dimethyl (or diethyl) ether; (7) nitrogen-containing cyclic compounds, such as pyrrolidone, N-methyl-2-pyrrolidone, and 1,3-dimethyl-2-imidazolidinone; and (8) sulfur-containing compounds, such as dimethyl sulfoxide and tetramethylene sulfone. Other useful organic solvents include lactones and lactams. Examples of suitable substituted or unsubstituted lactams include 2-pyrrolidone, 1-methyl 2-pyrrolidone, and N-(2-hydroxyethyl)-2-pyrrolidone.

Co-solvents are typically present in an amount of from about 5% to about 30% by weight, and more preferably from about 10% to about 30% by weight, including all ranges subsumed therein. As will be appreciated, the amounts of co-solvent will be dependent in part on the other components of the ink.

Another ingredient of the ink compositions described herein is a penetrant. Penetrants may be selected from the group consisting of 1,2-hexandiol, hexyl carbitol, diethylene glycol butyl ether, diethylene glycol benzyl ether, n-propyl alcohol, secondary alcohol ethoxylates such as TERGITOL 15-S-7 and TERGITOL 15-S-9 available from Union Carbide of Danbury, Conn., ethoxylated acetylenic diols such as SURFYNOL 465 and SURFYNOL 485 available from Air Products and Chemicals, Inc. of Allentown, Pa., polyalkyleneoxide modified heptamethyltrisiloxane such as the SILWET L series available from Loveland Industries, Inc. of Greeley, Colo., and mixtures thereof. A particularly preferred penetrant is a mixture of diethylene glycol monohexyl ether (n-hexyl carbitol) and 1,2-hexanediol. A preferred amount of hexyl carbitol in the ink composition ranges from about 0.1 to about 1.0 percent by weight, most preferably from about 0.3 to about 0.5 percent by weight based on the total weight of the ink composition. The amount of hexanediol in the ink composition preferably ranges from about 0.5 to about 5 percent by weight, most preferably from about 1 to about 3 percent by weight based on the total weight of the ink composition.

Other conventional additives may also be included in the ink composition such as biocides, mildew proofing agents, pH adjustors, antioxidants, conductivity modifiers, surfactants, chelating agents, viscosity modifiers, and oxygen-absorbing agents. Specific examples of biocides include sodium benzoate, sodium pentacholorphenol, sodium 2-pyridinethiol-1-oxide, sodium dehydroactate and 1,2-benzisothiazolin-3-one (PROXEL GXL).

Surfactants, such as for example, SILWET, may be added to modify the surface tension of the ink and to control the penetration of the ink into the paper. Such surfactants are included in the ink compositions, and are not a component of the dispersant. Suitable surfactants include nonionic, amphoteric and ionic surfactants, preferred surfactants include alkyl sulfate, nonyl phenyl polyethylene glycol, SILWET (OSI Sealants, Inc.), TERGITOLO (Union Carbide) and SURFYNOL (Air Products and Chemicals, Inc.).

Chelating agents, such as for example, ethylene diamine tetraacetate (EDTA), may be added to prevent any deleterious effects from metal or alkali metal ion contaminants or impurities. Typically, a chelating agent may be added to the composition in an amount of from about 0.1% to about 1.0% by weight.

Biocides, such as for example, 1,2-benz-isothiazolin-3-one, may be added to the ink to prevent or inhibit growth of microorganisms in the ink. A preferred biocide is PROXELQ'GXL, available from Avecia, Inc., Wilmington, Del. Generally, the addition of from about 0.1% to about 1.9% by weight of a biocide will be efficacious, preferably from about 0.1% to about 0.2%

Buffering agents, preferably potassium hydroxide, may also be added to adjust or maintain a desired pH for the ink. As will be appreciated, the amount of buffer will depend on the other components in the ink. However, it has been found that the addition of small amounts of buffer to the ink, such as from about 0.01% to about 0.3% by weight, is useful.

The order of addition of the components to provide the ink composition is not particularly critical to the invention. However, a preferred order for making the formulation is to add the dye and pigment as a pigment concentrate to water, then add the other components, i.e., the humectants, the penetrants and the biocide to the dye and pigment mixture. The components are thoroughly mixed to provide the ink composition.

The inks of the present invention may be prepared by essentially any process for preparing ink jet inks. A preferred procedure for preparing an illustrative ink is as follows: Humectants and penetrant(s) are added to the DI water and mixed for 20 minutes. Dyes are then slowly added and mixed for an additional 20 minutes. The pH of the ink is adjusted to from about 8.2 to about 8.5 with the pH buffer while mixing. The ink is then filtered through a series of filters, with the final filter being 0.22 microns.

In general, the above dyes comprise from about 0.2 to about 10%, preferably from about 1 to about 5% by weight of each ink jet ink composition. For the magenta ink composition, the dye mixture comprises from about 20 to about 60%, preferably from about 30 to about 50%, by weight of the water-soluble, magenta anthrapyridone dye and from about 0.05 to about 0.25 wt. % of a black dye.

A typical ink composition employed in the invention may comprise, for example, the following components by weight: colorant (0.05-20%), water (20-95%), a humectant (5-70%), water miscible co-solvents (2-20%), surfactant (0.1-10%), biocide (0.05-5%) and pH control agents (0.1-10%).

Representative dye ink formulations are given in the following table.

TABLE 1

|  | Black Ink | Wt. % | Cyan Ink | Wt. % | Magenta Ink | Wt. % | Yellow Ink | Wt. % |
|---|---|---|---|---|---|---|---|---|
| Colorant | Black Dye | 1.7 | Cyan Dye | 2.2 | Magenta dyes | 2-3 | Yellow Dye | 3.5 |
|  |  |  |  |  | Acid Red dyes | 2-2.5 |  | 0.0 |
|  |  |  |  |  | Black dye | 0.12-0.2 |  |  |
| Humectants | Glycerol | 5.0 | 1,2-propanediol | 7.0 | 1,5-pentanediol | 5.0 | 1,5-pentanediol | 5.0 |
|  | 1,3-propanedol | 8.0 | 1,3-propanediol | 7.0 | 1,3-propanediol | 10.0 | 1,3-propanediol | 10.0 |
|  | Triethylene glycol | 7.0 | Triethylene glycol | 6.0 | Dipropylene glycol | 5.0 | Triethylene glycol | 5.0 |
| Penetrant | 1,2-hexanediol | 0.0 | 1,2-hexanediol | 2.5 | 1,2-hexanediol | 2.5 | 1,2-hexanediol | 2.5 |
| Surfactant | SILWET | 0.5 | SILWET | 0.87 | SILWET | 0.8 | SILWET | 0.8 |
| Water | Water | 76.0 | Water | 74.0 | Water | 71.65 | Water | 73.0 |

Additional additives which may optionally be present in the inkjet ink compositions provided by the disclosed embodiments including, but not limited to, thickeners, conductivity enhancing agents, anti-kogation agents, drying agents, anti-corrosion agents, and defoamers.

The ink jet ink set described herein may be used in ink jet printing wherein liquid ink drops are applied in a controlled fashion to an ink receptive layer substrate, by ejecting ink droplets from a plurality of nozzles or orifices of the print head of an inkjet printer.

Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Inkjet printing methods, and related printers, are commercially available and need not be described in detail.

The inkjet ink set employed in the present invention can be used in any of the popular ink jet printing systems, including thermal or piezoelectric drop-on-demand printers and continuous inkjet printers. Of course, the specific ink formulations will vary depending upon the type of ink jet printing system.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference. In a preferred embodiment of the invention, the ink-receiving layer comprises alumina, as disclosed in copending application Ser. No. 09/770,814 of Bermel et al., the disclosure of which is hereby incorporated by reference. In another preferred embodiment, the ink-receiving layer has a surface pH of less than about 7.

With reference to FIG. 1, there is shown a comparison of the contrast or darkness qualities of magenta ink compared to a standard (S) wherein Ink A was devoid of black dye and Ink B contained 0.2 wt. % of black dye based on a total weight percent of the magenta ink composition. Ideally, the lower the L* value the higher the contrast or darkness of the image. In this case, Ink B containing a mixture of red dyes and black dye had almost the same darkness or image contrast as the standard S.

Figure 2:
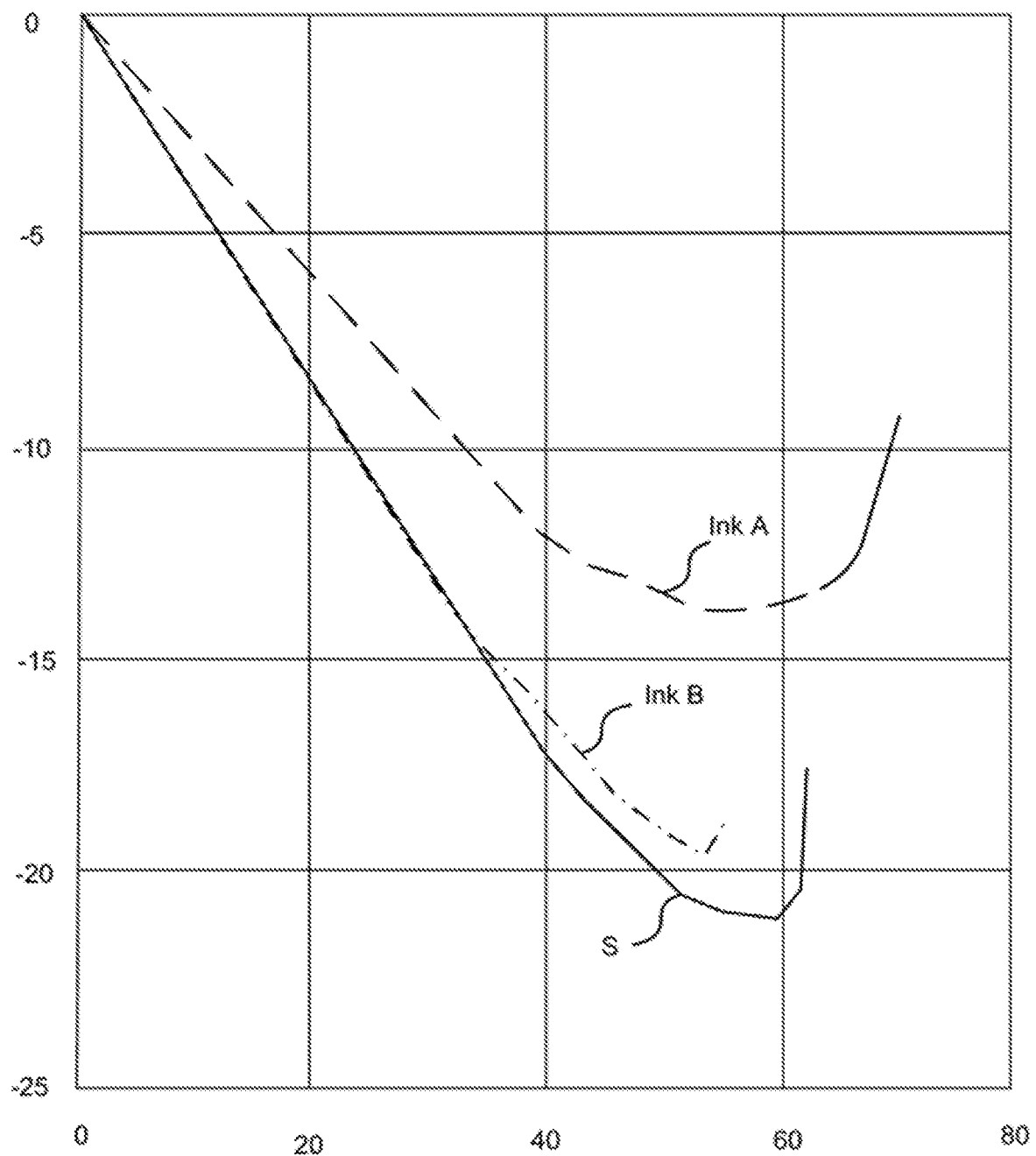
FIG. 2 is a graphical representation of redness and blueness of a magenta printed image on a substrate.

An evaluation of the a*b* values or blueness of the magenta ink composition (Ink B) as compared to Ink A devoid of black dye and the standard S is shown in FIG. 2. As shown, Ink B approaches the standard S for blueness of the magenta ink.

The following table provides a comparison of the properties of magenta dyes with respect to hue angle, brightness or chroma, contrast, and lightfastness. The desirable properties of a suitable magenta ink are listed in the table.

TABLE 2

| DYE | HUE ANGLE | CHROMA C* | CONTRAST L* | LIGHT-FASTNESS ΔE |
|---|---|---|---|---|
| Desired Magenta Ink Properties | 340-342 | >75 | <50 | <5 |
| IJINKM-001 SLK | 10 | 65 | 44 | <5 |
| Acid Red 18 | 22.5 | 65 | 61 | >10 |
| Direct Red 227 | 349.2 | 67 | 52 | >10 |
| Acid Red 33 | 349.2 | 73 | 42 | >10 |
| Acid Red 249 | 350.8 | 75 | 55 | >10 |
| JPD LM-1 | 337.8 | 61 | 63 | <5 |
| Acid Red 289 | 339.0 | 89 | 53 | >20 |
| Acid Red 52 | 326.3 | 93 | 47 | >40 |
| Violet dye | 314.1 | 55 | 47 | <5 |

As shown by the foregoing Table 2, none of the red dyes used alone provide all of the desired properties.

In the following table, mixtures of red dyes are shown in an attempt to improve the properties of the magenta ink composition. All of the magenta ink compositions in Table 3 had the desired hue angle of 340-342 and a chroma (C*) of greater than 75.

TABLE 3

| DYE | CONTRAST L* | LIGHT-FASTNESS ΔE |
|---|---|---|
| Desired Magenta Ink Properties | <50 | <5 |
| 2.0 wt. % Acid Red 33 + 0.65 wt. % Acid Red 289 | <50 | >15 |
| 3.0 wt. % JPD LM-1 + 2.0 wt. % Acid Red 289 | 50-55 | >5 |

TABLE 3-continued

| DYE | CONTRAST L* | LIGHT-FASTNESS ΔE |
|---|---|---|
| 3.0 wt. % JPD LM-1 + 1.4 wt. % Direct Red 227 + 0.6 wt. % Acid Red 289 | 50-55 | >5 |
| 4.0 wt. % JPD LM-1 + 1.8 wt. % Acid Red 249 + 0.8 wt. % Acid Red 289 | 50-55 | >5 |
| 2.2 wt. % JPD LM-1 + 0.4 wt. % Acid Red 249 + 0.4 wt. % Acid Red 289 + 0.3 wt. % Acid Red 33 + 0.13 wt. % Acid Red 52 | <50 | >10 |

As shown in the above table 3, none of the ink compositions have suitable lightfastness and several are marginal with respect to contrast.

In the following table, a mixture of red dyes and a black dye are provided. Both of the magenta ink compositions in Table 4 had the desired hue angle of 340-342, a chroma (C*) of greater than 75, and a contrast (L*) of less than 50.

TABLE 4

| DYE | LIGHTFASTNESS ΔE |
|---|---|
| Desired Magenta Ink Properties | <5 |
| 3.0 wt. % JPD LM-1 + 1.4 wt. % Acid Red 249 + 0.6 wt. % Acid Red 289 + 0.15 wt. % Fast Black 2 | >5 |
| 2.0 wt. % JPD LM-1 + 2.3 wt. % Acid Red 249 + 0.6 wt. % Acid Red 289 + 0.4 wt. % Acid Red 52 + 0.18 wt. % Fast Black 2 | >5 |

Figure 3:
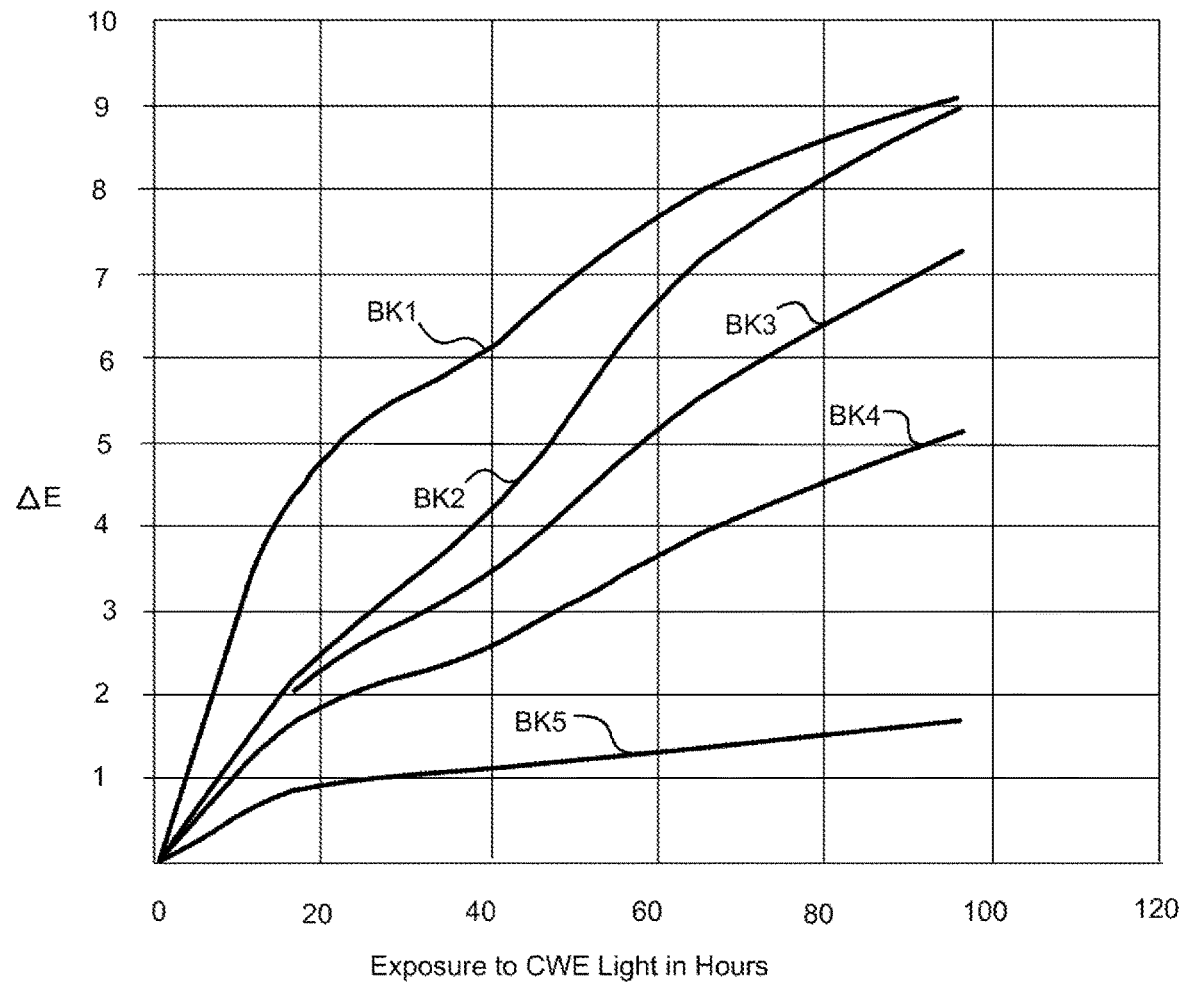
FIG. 3 is a graphical comparison of lightfastness of various black dyes.

As shown in the foregoing table, Fast Black 2 dye improves the contrast (L*), but fails to improve the lightfastness of the magenta ink composition In order to improve the lightfastness of the magenta ink composition, various other black dyes were tested using a cool white fluorescent (CWF) light that simulates the CIE standard illuminant F2. A comparison of the lightfastness of back dyes is shown in FIG. 3. In FIG. 3 BK1 is FASTK1, BK2 is Fast Black 2, BK3 is Direct Black 168, BK4 is PRO-JET CBA, and BK5 is JPD LMBK-001. As shown BK5 has the lowest ΔE after exposure to CWF light for over 80 hours indicating that BK5 had the best light fastness of the black dyes tested.

A comparison of the lightfastness of magenta ink compositions containing PRO-JET CBA and JPD LMBK-001 black dyes is shown in Table 5.

TABLE 5

| DYE | LIGHTFASTNESS ΔE |
|---|---|
| Desired Magenta Ink Properties | <5 |
| 3.0 wt. % JPD LM-1 + 2.0 wt. % Acid Red 249 + 0.2 wt. % PRO-JET CBA | <5 |
| 2.2 wt. % IJINKM-001 SLK + 1.0 wt. % Acid Red 249 +1.1 wt. % Acid Red 289 + 0.2 wt. % Acid Red 52 + 0.12 wt. % PRO-JET CBA | <5 |
| 2.2 wt. % IJINKM-001 SLK + 1.0 wt. % Acid Red 249 + 1.1 wt. % Acid Red 289 + 0.2 wt. % Acid Red 52 + 0.15 wt. % JPD LMBK-001 | <3 |

All of the ink compositions in the foregoing table had the desired hue angle of 340-342, a chroma (C*) of greater than 75, a contrast (L*) of less than 50, and desired lightfastness ΔE of less than 5. JPD LMBK-001 had a bluish shade compared to PRO-JET CBA. It was surprising and quite unexpected that a magenta ink composition containing a combination of magenta dyes and a minor amount of black dye would provide an ink composition that was lightfast and had all of the other important ink characteristics.

In view of the foregoing results, use of a black dye having a bluish tint was the most desirable black dye to use in combination with the magenta dyes. Particularly useful black dyes may have the following characteristics:
  Hue Angle ranging from 256 to 274
  Chroma (C*) ranging from 9 to 14
  Contrast (L*) ranging from 7 to 32
  Lightfastness (ΔF) ranging from 17 to 31

Accordingly, a representative magenta ink composition may include the following dyes for balancing the color, print quality and lightfastness of the ink composition:
  IJINKM-001 SLK
  Acid Red 249
  Acid Red 289
  Acid Red 52
  JPD LMBK-001.

The above results show that the inkjet ink set employed in the invention containing a magenta dye mixture containing a black dye yields magenta ink compositions with desirable hue angle, contrast, chroma and lightfastness.

It is contemplated, and will be apparent to those skilled in the art from the foregoing specification that modifications and/or changes may be made in the embodiments of the invention. Accordingly, it is expressly intended that the foregoing are only illustrative of the preferred embodiments and are not limiting thereto and that the true spirit and scope of the present invention be determined by reference to the appended claims.

What is claimed is:

1. A magenta dye-based ink composition comprising a combination of dyes consisting of (a) one or more red dye(s) and (b) a minor but effective amount of black dye, wherein a weight ratio of red dye(s) to black dye in the combination of dyes ranges from about 20:1 to about 100:1, and wherein the black dye is selected from the group consisting of lightfast black dyes that provide the magenta dye-based ink composition with a ΔE of less than 5.

2. The magenta dye-based ink composition of claim 1, wherein the amount of black dye in the ink composition ranges from about 0.05 to about 0.25 percent by weight based on a total weight of the ink composition.

3. The magenta dye-based ink composition of claim 1, wherein the black dye comprises a lightfast black dye having a bluish tint.

4. The magenta dye-based ink composition of claim 1, wherein the black dye comprises a lightfast azo direct dye black.

5. The magenta dye-based ink composition of claim 1, wherein the red dye is selected from the group consisting of acid red dyes, anthrapyridone disulfonic acid dyes, pyridine azo dyes, and mixtures thereof.

6. The magenta dye-based ink composition of claim 1, wherein the combination of dyes consists of the black dye and a mixture of red dyes.

7. The magenta dye-based ink composition of claim 1, further comprising a humectant, a solvent, a penetrant, a surfactant, and water.

8. An ink set comprising the magenta dye-based ink composition of claim 1, a cyan ink composition, a yellow ink composition.

9. A method for improving the print qualities of a magenta dye-based ink composition comprising:

mixing a minor amount of black dye, selected from the group consisting of lightfast black dyes with one or more red dyes in a weight ratio of red dye to black dye of from about 20:1 to about 100:1 to provide a combination of dyes consisting of only the one or more red dyes and the black dye, and adding the combination of dyes to ink components other than dyes to provide the magenta dye-based ink composition, wherein the magenta dye-based ink composition has a ΔE of less than 5.

10. The method of claim 9, wherein the amount of black dye in the combination of dyes ranges from about 0.05 to about 0.25 percent by weight based on a total weight of the ink composition.

11. The method of claim 9, wherein the black dye comprises a lightfast black dye having a bluish tint.

12. The method of claim 9, wherein the black dye comprises a lightfast azo direct dye black.

13. The method of claim 9, wherein the red dye is selected from the group consisting of acid red dyes, anthrapyridone disulfonic acid dyes, pyridine azo dyes, and mixtures thereof.

14. The method of claim 9, further comprising mixing a humectant, a solvent, a penetrant, a surfactant, and water with the combination of dyes to provide the magenta dye-based ink composition.

15. A magenta dye-based ink composition comprising a combination of dyes consisting of (a) one or more red dye(s) and (b) a minor but effective amount of black dye, selected from the group consisting of lightfast black dyes, wherein a weight ratio of red dye(s) to black dye in the combination of dyes ranges from about 20:1 to about 100:1, wherein the amount of black dye in the ink composition ranges from about 0.05 to about 0.25 percent by weight based on a total weight of the ink composition to provide the magenta dye-based ink composition having a ΔE of less than 5.

16. The magenta dye-based ink composition of claim 15, wherein the black dye in the combination of dyes comprises a lightfast azo direct dye black.

17. The magenta dye-based ink composition of claim 15, wherein the red dye in the exclusive combination of dyes is selected from the group consisting of acid red dyes, anthrapyridone disulfonic acid dyes, pyridine azo dyes, and mixtures thereof.

18. The magenta dye-based ink composition of claim 15, further comprising a humectant, a solvent, a penetrant, a surfactant, and water.

19. An ink set comprising the magenta dye-based ink composition of claim 15, a cyan ink composition, a yellow ink composition.

* * * * *